(12) United States Patent
Steinmetz et al.

(10) Patent No.: US 6,319,172 B1
(45) Date of Patent: Nov. 20, 2001

(54) OFF-GOING CLUTCH CONTROL FOR UPSHIFTING OF AN AUTOMATIC TRANSMISSION

(75) Inventors: Todd M Steinmetz, Indianapolis; Gregory A Hubbard, Carmel, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/524,595

(22) Filed: Mar. 14, 2000

(51) Int. Cl.[7] ............................ F16H 61/04; F16H 61/06; F16H 61/08
(52) U.S. Cl. .................... 477/143; 477/155; 192/87.13
(58) Field of Search .................................... 477/143, 154, 477/155, 169; 192/87.18, 87.13, 87.14

(56) References Cited

U.S. PATENT DOCUMENTS

| | | | |
|---|---|---|---|
| 5,119,695 | * | 6/1992 | Milunas et al. ................. 74/866 |
| 5,216,606 | * | 6/1993 | Lentz et al. ................. 364/424.1 |
| 5,467,854 | * | 11/1995 | Creger et al. ................. 192/87.18 |
| 5,580,332 | * | 12/1996 | Mitchell et al. ................. 477/143 |

* cited by examiner

Primary Examiner—Sherry Estremsky
Assistant Examiner—Tisha D. Lewis
(74) Attorney, Agent, or Firm—Laura C. Hargitt; Leslie C. Hodges

(57) ABSTRACT

An improved transmission upshift control in which the off-going clutch is controlled to emulate the behavior of an ideal free-wheel device to thereby achieve nearly ideal timing of the off-going clutch disengagement relative to the on-coming clutch engagement. During the preparation phase of the shift, the off-going pressure is reduced in proportion to the estimated volume of fluid supplied to the on-coming clutch such that the off-going pressure is at a calibrated value when the on-coming clutch is filled. However, the calibrated value is adjusted upward in direct relation to the transmission input torque above a given level so as to emulate the reaction torque that would be exerted by an ideal free-wheel device for maintaining the current speed ratio. The torque phase of the control commences when the estimated volume indicates that the on-coming clutch is completely filled. At such point, the off-going clutch pressure decreases from the calibrated value at a rate determined as a function of the scheduled on-coming clutch torque to emulate the rate of decay that would occur with an ideal free-wheel device as the on-coming clutch engages. If the confidence level is low, the off-going clutch control parameters are biased to extend the engagement of the off-going clutch. If the extended engagement of the off-going clutch results in a tie-up condition due to engagement of the on-coming clutch, the off-going pressure is quickly released.

12 Claims, 6 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

OFF-GOING CLUTCH CONTROL FOR UPSHIFTING OF AN AUTOMATIC TRANSMISSION

TECHNICAL FIELD

This invention relates to a shift control for an automatic transmission, and more particularly to a control of the off-going clutch during an upshift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

Shifting from a currently established speed ratio to new speed ratio involves, in most cases, disengaging a clutch (off-going clutch) associated with the current speed ratio and engaging a clutch (on-coming clutch) associated with the new speed ratio. The ideal clutch timing for a power-on upshift is graphically depicted in FIG. 3, where Graph A depicts the clutch pressure or torque capacity for the on-coming (light trace) and off-going (heavy trace) clutches, and Graph B depicts the speed of the transmission input shaft. The shift is generally characterized as comprising three phases: a preparation phase, a torque phase, and an inertia phase. In the preparation phase, the on-coming clutch is filled in preparation for torque transmission, and the off-going clutch pressure is progressively reduced in preparation for disengagement. In the torque phase, the on-coming clutch gains torque capacity, and the off-going clutch loses torque capacity at a rate that matches the rate of increase in torque capacity of the on-coming clutch, but without a corresponding change in the input speed. The input speed change occurs during the inertia phase, as the on-coming clutch pressure is controlled to decelerate the input shaft, and the off-going clutch is fully released. FIGS. 4 and 5 graphically illustrate upshifts with improper timing of the off-going clutch disengagement. In FIG. 4, the off-going clutch is released during the preparation phase, before the on-coming clutch has achieved sufficient torque capacity; this allows the engine to momentarily accelerate the input shaft prior to the inertia phase of the shift, resulting in a loss of output torque which is perceived by the vehicle occupants as a momentary neutral sensation. In FIG. 5, the off-going clutch is released after the on-coming clutch has achieved sufficient torque capacity; this results in what is known as a tie-up interval during which the on-coming and off-going clutches are working in opposition, resulting in a sharp drop in output torque that is perceived by the vehicle occupants as a momentary braking sensation.

Since the relative timing of the on-coming engagement and the off-going disengagement is critical to achieving a high quality shift, it has been customary to use a uni-directional torque transmitting mechanism, such as a free-wheel clutch, to release the off-going clutch as the torque capacity of the on-coming clutch builds up during the torque phase of the shift, closely approximating the ideal timing depicted in FIG. 3. However, free-wheel clutches significantly increase the cost of a transmission, and various electronic control techniques have been developed for achieving clutch-to-clutch upshifts in which an electronic control unit controls both the on-coming clutch apply and the off-going clutch release. See, for example, the U.S. Pat. No. 5,058,460 to Hibner et al., issued on Oct. 22, 1991, and assigned to the assignee of the present invention, and the U.S. Pat. No. 5,119,695 to Milunas et al., issued on Jun. 9, 1992, and assigned to Saturn Corporation, which patents are incorporated herein by reference. Both of these patents utilize open-loop controls to release the off-going clutch in relation to the estimated or detected end-of-fill of the on-coming clutch. Additionally, Milunas et al. schedule the rate of reduction in off-going clutch pressure based on a confidence level determined by the controller. The off-going pressure is reduced at a slow rate when the confidence level is low, and at a fast rate when the confidence level is high, providing a variable degree of clutch overlap. Additionally, the input speed is monitored to detect a tie-up condition due to on-coming clutch engagement, and the off-going clutch is released if a tie-up condition is detected.

SUMMARY OF THE INVENTION

The present invention is directed to an improved transmission upshift control in which the off-going clutch is controlled to emulate the behavior of an ideal free-wheel device to thereby achieve nearly ideal timing of the off-going clutch disengagement relative to the on-coming clutch engagement. According to the invention, the off-going clutch is released based on the on-coming clutch control parameters. During the preparation phase of the shift, the off-going pressure is reduced in proportion to the estimated volume of fluid supplied to the on-coming clutch such that the off-going pressure is at a calibrated value when the on-coming clutch is filled. However, the calibrated value is adjusted upward in direct relation to the transmission input torque above a given level so as to emulate the reaction torque that would be exerted by an ideal free-wheel device for maintaining the current speed ratio. The torque phase of the control commences when the estimated volume indicates that the on-coming clutch is completely filled. At such point, the off-going clutch pressure decreases from the calibrated value at a rate determined as a function of the scheduled on-coming clutch torque to emulate the rate of decay that would occur with an ideal free-wheel device as the on-coming clutch engages.

In the preferred embodiment, a confidence indication controls the utilization of the above-described off-going control parameters. If the confidence level is high, the off-going clutch release is carried out in accordance with the above-described parameters. However, under low confidence conditions such as low or high fluid temperatures or transient input torque levels, the off-going clutch control parameters are biased to extend the engagement of the off-going clutch. If the extended engagement of the off-going clutch results in a tie-up condition due to engagement of the on-coming clutch, the off-going pressure is quickly released.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
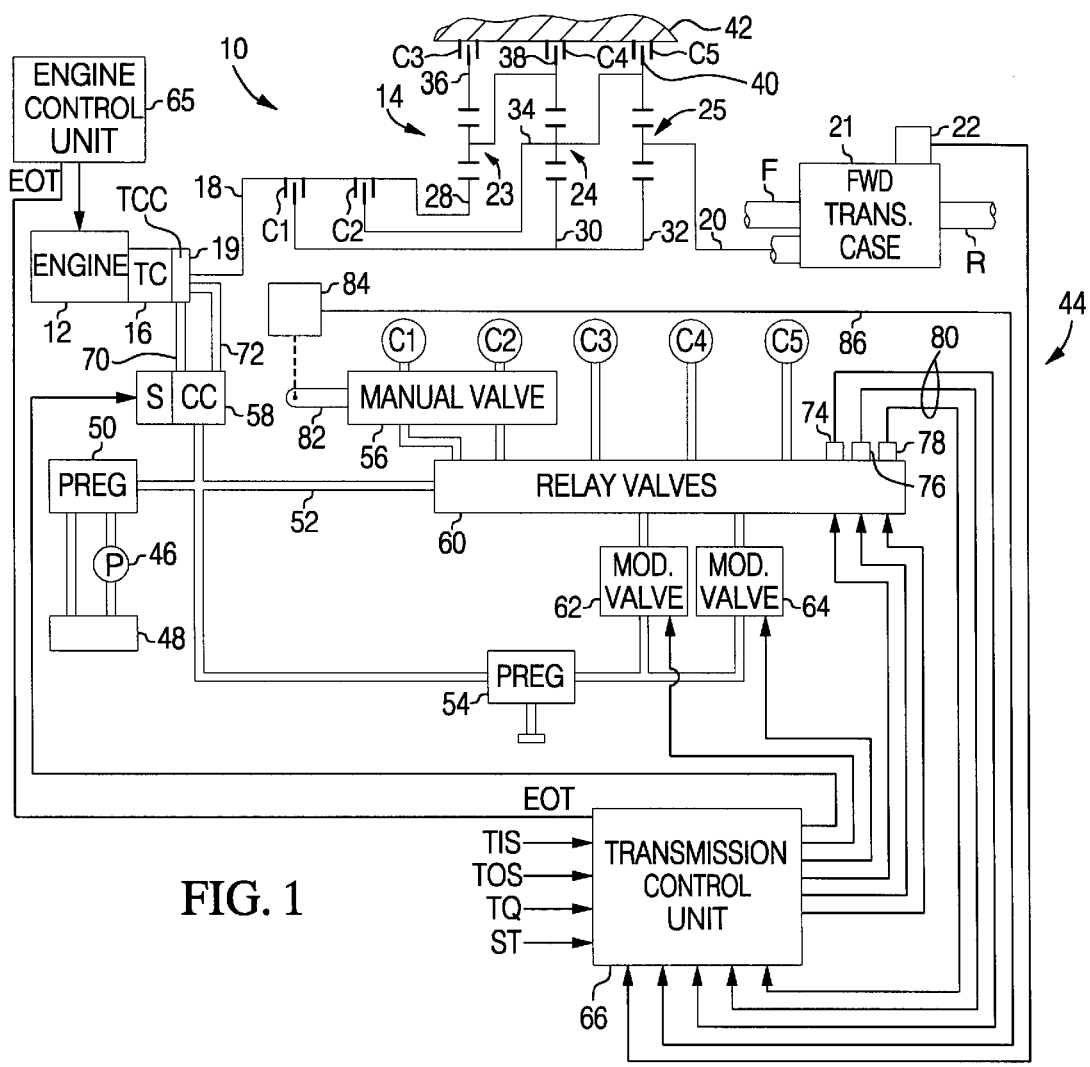
FIG. 1 is a diagram of an automatic transmission and microprocessor-based control unit for carrying out the control of this invention.
FIG. 2 is a diagram indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate elements. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, a driver torque command TQ, and the transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and then supplies current to the respective force motors in accordance with the current commands.

Figure 3:
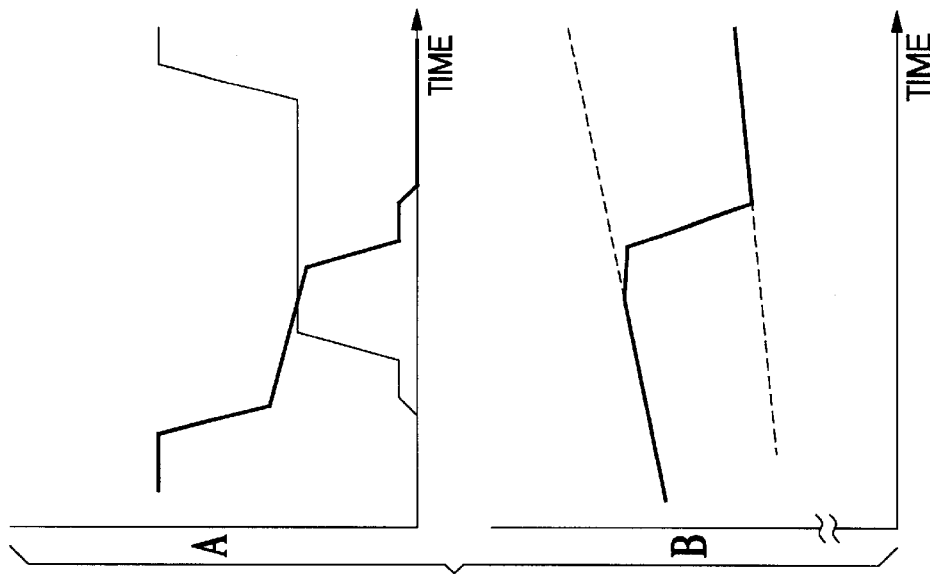
FIG. 3, Graphs A and B, depict on-coming and off-going clutch pressures, and input speed, respectively, for an ideal power-on upshift.
Figure 4:
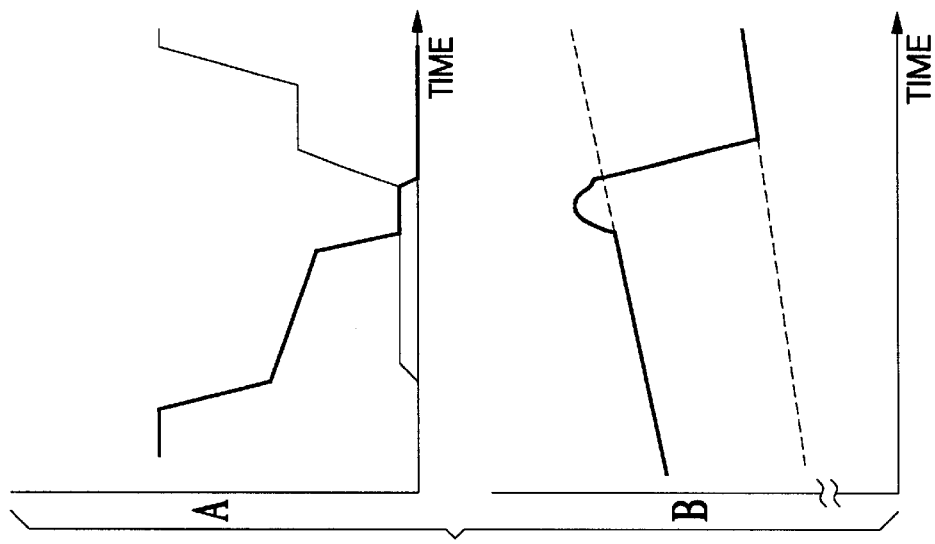
FIG. 4, Graphs A and B, depict on-coming and off-going clutch pressures, and input speed, respectively, for a power-on upshift in which the off-going clutch is released too soon.
Figure 5:
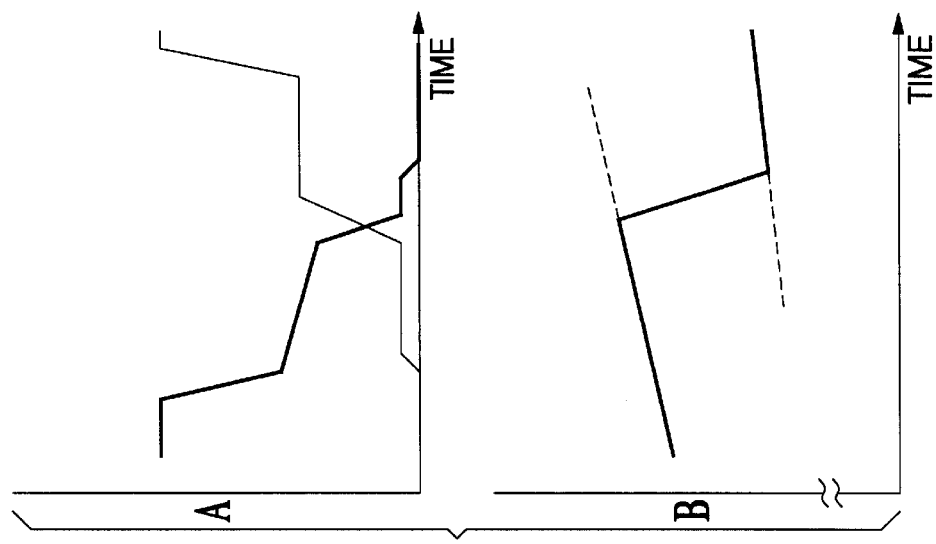
FIG. 5, Graphs A and B, depict on-coming and off-going clutch pressures, and input speed, respectively, for a power-on upshift in which the off-going clutch is released too late.

Proper timing of the on-coming clutch engagement and off-going clutch disengagement is essential to achieving good shift quality. This was illustrated above in reference to FIGS. 3–5, as applied to a power-on upshift. The present invention is directed to an improved control strategy for the off-going clutch which takes into account the transmission input torque and the on-coming clutch control parameters to emulate the behavior of an ideal free-wheel device, thereby achieving nearly ideal timing of the off-going clutch disengagement relative to the engagement of the on-coming clutch. During the preparation phase of the shift, the off-going pressure is reduced in proportion to the estimated volume of fluid supplied to the on-coming clutch such that the off-going pressure is at a calibrated value (referred to herein as Pinit) when the on-coming clutch is filled. However, Pinit is adjusted upward in direct relation to the transmission input torque magnitude above a given level so as to emulate the reaction torque that would be exerted by an ideal free-wheel device for maintaining the current speed ratio. During the torque phase of the shift, the off-going pressure decreases from Pinit at a rate determined as a function of the scheduled on-coming clutch torque (or pressure) to emulate the rate of decay that would occur with an ideal free-wheel device as the on-coming clutch engages.

Figure 6:
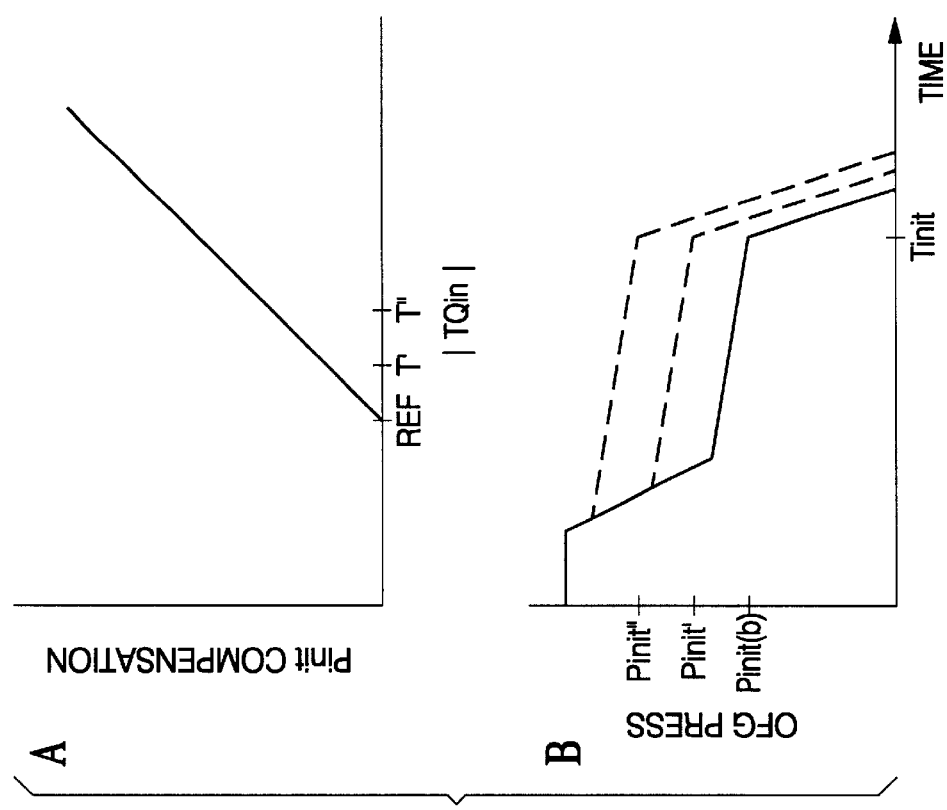
FIG. 6, Graphs A and B, depict the control of off-going clutch pressure during the preparation phase of a shift according to this invention. Graph A depicts a compensation amount, and Graph B depicts base and modified off-going pressure profiles, assuming that the transmission input torque remains constant during the shift.

As illustrated in FIG. 6, the off-going pressure profile varies with the magnitude of transmission input torque above a given level REF. Graph A of FIG. 6 depicts a pressure compensation amount as a function of the transmission input torque magnitude, and Graph B depicts several off-going clutch pressure profiles to illustrate the effect of adjusting the calibrated pressure Pinit, assuming that the transmission input torque remains constant during each respective shift. The solid trace represents a pressure profile characterized by the base pressure value Pinit(b), while the broken traces represent off-going pressure profiles with successively higher pressure values Pinit', Pinit" corresponding to successively higher input torque values T', T", assuming that the rate of fluid supply to the on-coming clutch remains constant. Selecting a preparation phase pressure profile based on transmission input torque achieves an off-going clutch torque capacity that matches the reaction torque exerted by a free-wheel clutch to maintain the current speed ratio during the preparation phase of the shift.

Figure 7:
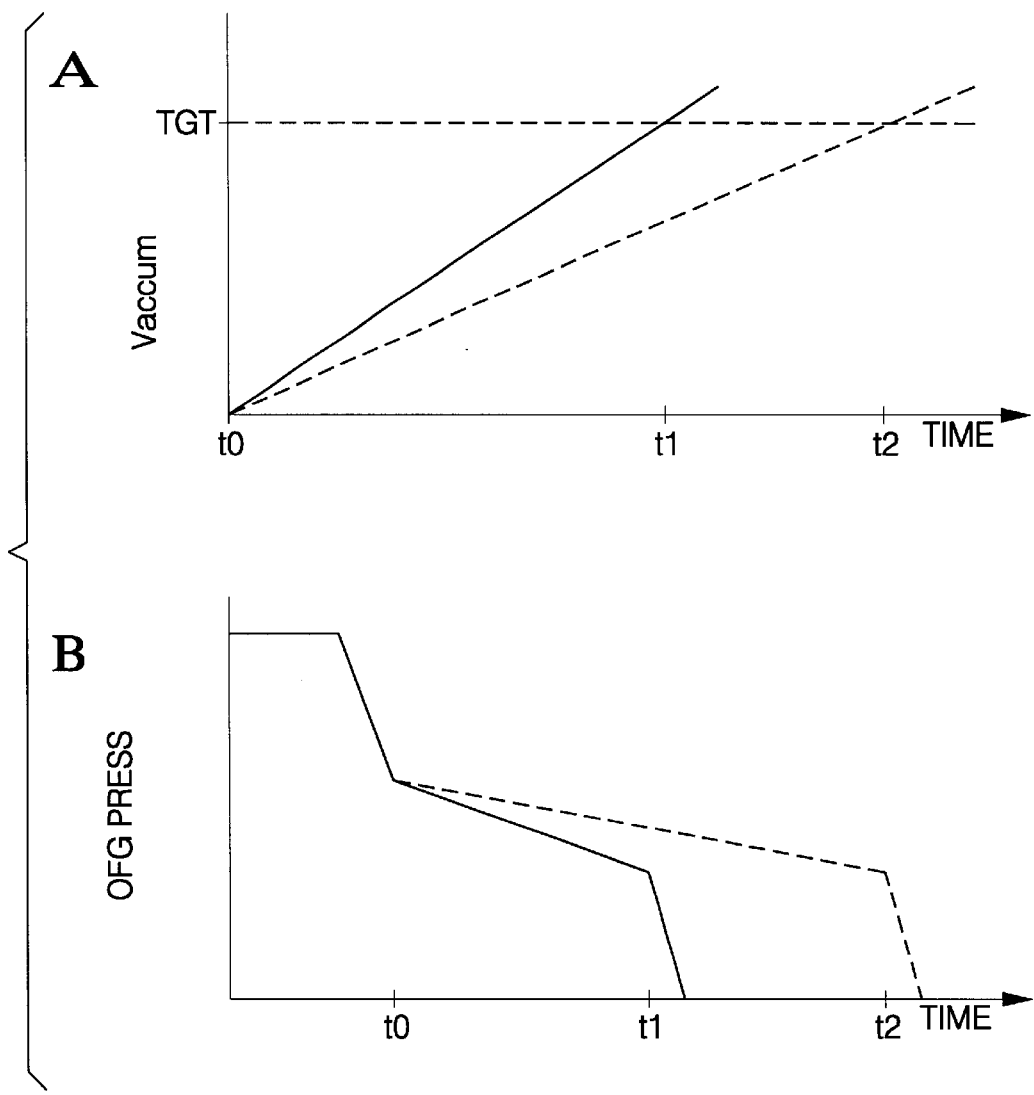
FIG. 7, Graphs A and B, depict the initiation of a torque phase off-going clutch pressure according to this invention. Graph A depicts the cumulative volume of fluid supplied to the on-coming clutch for low and high torque shifts, assuming a constant flow rate during the respective shifts, and Graph B depicts corresponding off-going pressure profiles.

FIG. 7 illustrates how the off-going pressure during the preparation phase of the shift changes depending on the fill rate of the on-coming clutch. Graph A depicts the cumulative volume of fluid Vaccum supplied to the on-coming clutch, and Graph B depicts the off-going clutch pressure. The torque phase of the off-going pressure control is initiated when the cumulative volume Vaccum reaches a target TGT representing the known volume of the apply chamber of the on-coming clutch. In a high torque shift, represented by the solid trace in each graph, the fill pressure for the on-coming clutch is relatively high, and Vaccum quickly rises to the target level TGT, initiating the torque phase of the off-going pressure control at time t1. In a lower torque shift, represented by the broken trace in each graph, the fill pressure for the on-coming clutch is somewhat lower, and Vaccum rises more slowly. In such case, Vaccum reaches TGT later in time, and the torque phase of the off-going pressure control is initiated at time t2. Controlling the off-going pressure in this manner achieves an off-going clutch torque capacity that accounts for the on-coming clutch flow rate and the resultant variation in on-coming clutch fill time.

Figure 8:
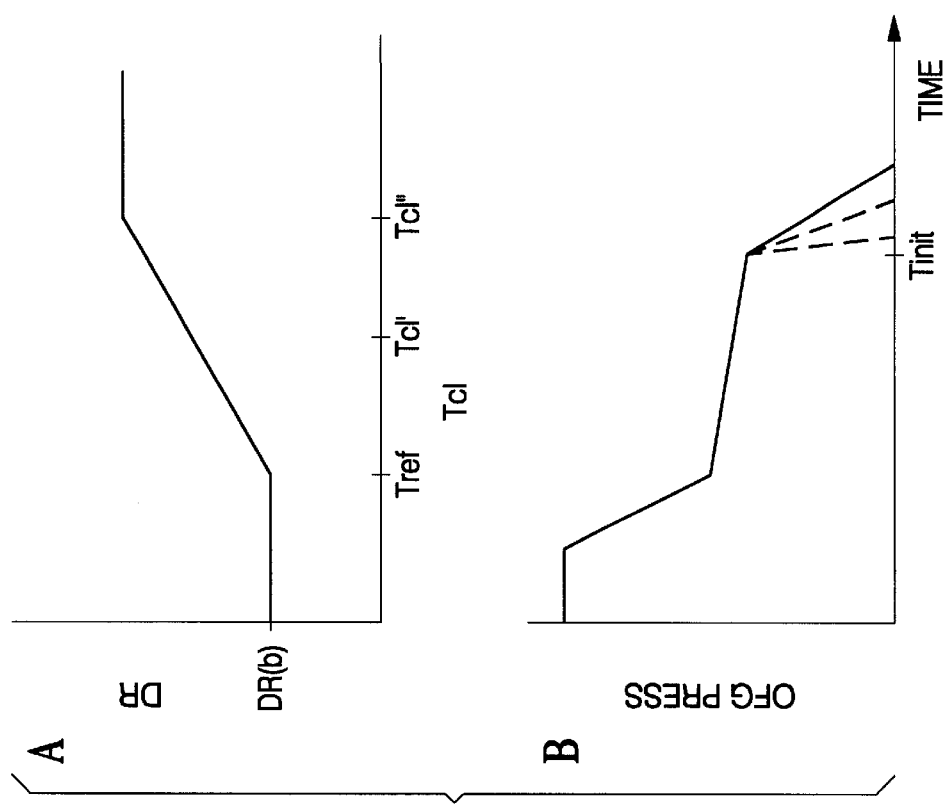
FIG. 8, Graphs A and B, depict the control of off-going clutch pressure during the torque phase of a shift according to this invention. Graph A depicts a desired rate of pressure decrease as a function of on-coming clutch torque, and Graph B depicts off-going pressure profiles for shifts with different levels of on-coming clutch torque, assuming that the on-coming coming clutch torque remains constant during the respective shifts.

FIG. 8 graphically illustrates how the rate of off-going pressure decrease during the torque phase of the shift increases in relation to the commanded on-coming clutch torque (or pressure). Graph A depicts a desired rate DR as a function of commanded on-coming clutch torque Tcl, and Graph B depicts the off-going clutch pressure. The desired rate DR has a base value DR(b) when Tcl is less than a reference torque Tref, and generally increases with commanded clutch torque in excess of Tref. In Graph B, the solid trace represents a pressure profile with the base rate DR(b), while the broken traces represent pressure profiles with successively higher values of DR corresponding to shifts carried out with successively increasing values Tcl', Tcl" of commanded on-coming clutch torque, assuming that the commanded on-coming clutch torque remains constant during each respective shift. Selecting a pressure ramp rate for the torque phase based on on-coming clutch torque (or pressure) achieves an off-going clutch torque capacity that matches the rate of torque capacity decay that would be exhibited by an ideal free-wheel device.

Figure 9:
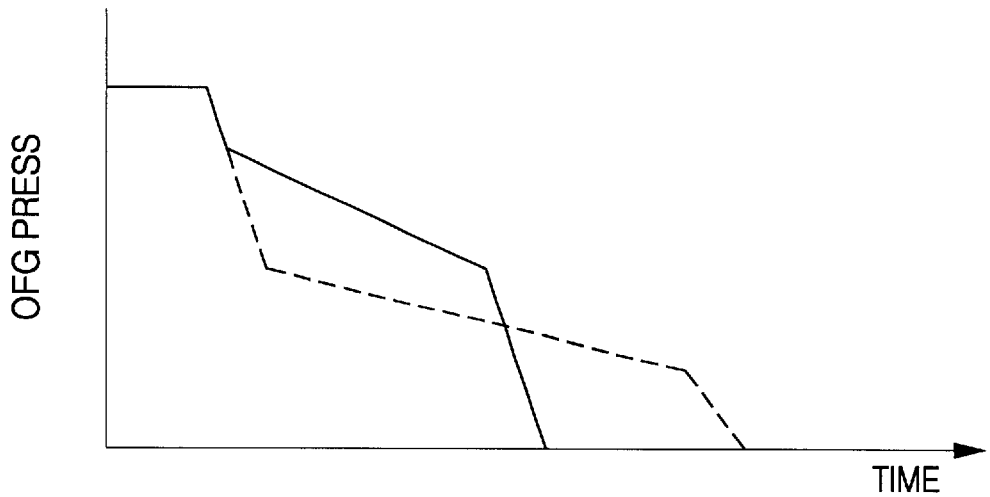
FIG. 9 graphically depicts a range of variation of the off-going pressure profile for different upshifts, according to this invention, assuming that the on-coming clutch flow rate, the transmission input torque and the commanded on-coming clutch torque remain constant during the respective shifts.

The range of variation comprehended by the above-described control is graphically illustrated in FIG. 9, where the solid trace represents an off-going pressure profile for a high torque power-on upshift, and the broken trace represents an off-going pressure profile for a low torque power-on upshift, assuming that the on-coming clutch flow rate, the transmission input torque and the commanded on-coming clutch torque remain constant during the respective shifts. The actual pressure profile in any given shift is uniquely tailored to that shift as explained above, and is subject to dynamic adjustment during the shift if the control parameters (on-coming clutch flow rate, transmission input torque, or commanded on-coming clutch torque) change.

In the preferred embodiment, the control unit 66 develops a confidence level CONF representing the relative ability of the control system 44 to accurately control the on-coming and off-going clutch pressures, and uses the confidence value to adjust the above-described off-going clutch control parameters. If the confidence level is high, the off-going clutch release is carried out as described above. However, if the confidence is low, the off-going clutch control parameters are biased to extend the engagement of the off-going clutch. If the extended engagement of the off-going clutch results in a tie-up condition due to engagement of the on-coming clutch, the off-going pressure is quickly released. An example of a suitable tie-up detection and off-going release control is described, for example, in the aforementioned patent to Milunas et al. More particularly, if the confidence level CONF is low, the off-going pressure during the preparation phase of the shift is increased, the initiation of the torque phase control is delayed, and the rate of pressure reduction during the torque phase is decreased.

Figure 10:
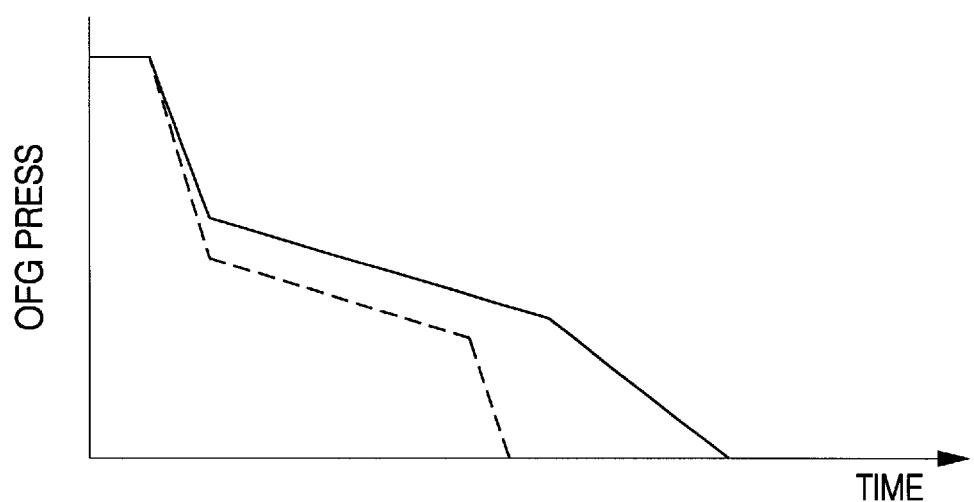
FIG. 10 depicts the control of off-going clutch pressure for upshifts at high and low confidence according to this invention, assuming that the confidence level remains constant during the respective shifts.

FIG. 10 graphically illustrates the effect of confidence on the off-going pressure control. The broken trace represents an off-going pressure profile when the confidence level CONF is high, whereas the solid trace represents a profile when the confidence level CONF is low, assuming that the confidence level remains constant during each respective shift. Comparing the solid trace to the broken trace, it will be seen that under low-confidence conditions, (1) the off-going pressure is increased during the preparation phase, (2) the torque phase of the control is initiated later in time, and (3) the rate of pressure decrease during the torque phase of the control is decreased. If a tie-up condition occurs due to engagement of the on-coming clutch before the off-going clutch is disengaged, the above-described off-going pressure control is terminated, and the off-going clutch is quickly released.

The confidence level CONF can be estimated based on several factors including the transmission fluid temperature Tsump, the rate of change of engine output torque BOT (or engine throttle THR) during shifting, an estimate of the time since the on-coming clutch was last exhausted, and conditions indicative of air entrapment in the on-coming clutch apply chamber. In regard to fluid temperature Tsump, the confidence is highest when Tsump is at a stable, steady-state level, and is lower during warm-up and when the temperature exceeds a normal level. A rapid rate of change of engine torque during shifting simply indicates a transient input torque condition, and the confidence level is decreased in relation to the magnitude of the transient. If the time since the on-coming clutch was last exhausted (due to a previous shift) is relatively short, there may be residual fluid in the clutch or its supply lines, and the confidence level is adjusted downward to reflect the resulting uncertainty regarding the clutch fill time. Similarly, if conditions indicate the presence of air trapped in the on-coming clutch apply chamber or supply lines, the confidence level is adjusted downward, as the entrapped air disturbs the normal relationship between fluid flow and torque capacity.

Figure 11:
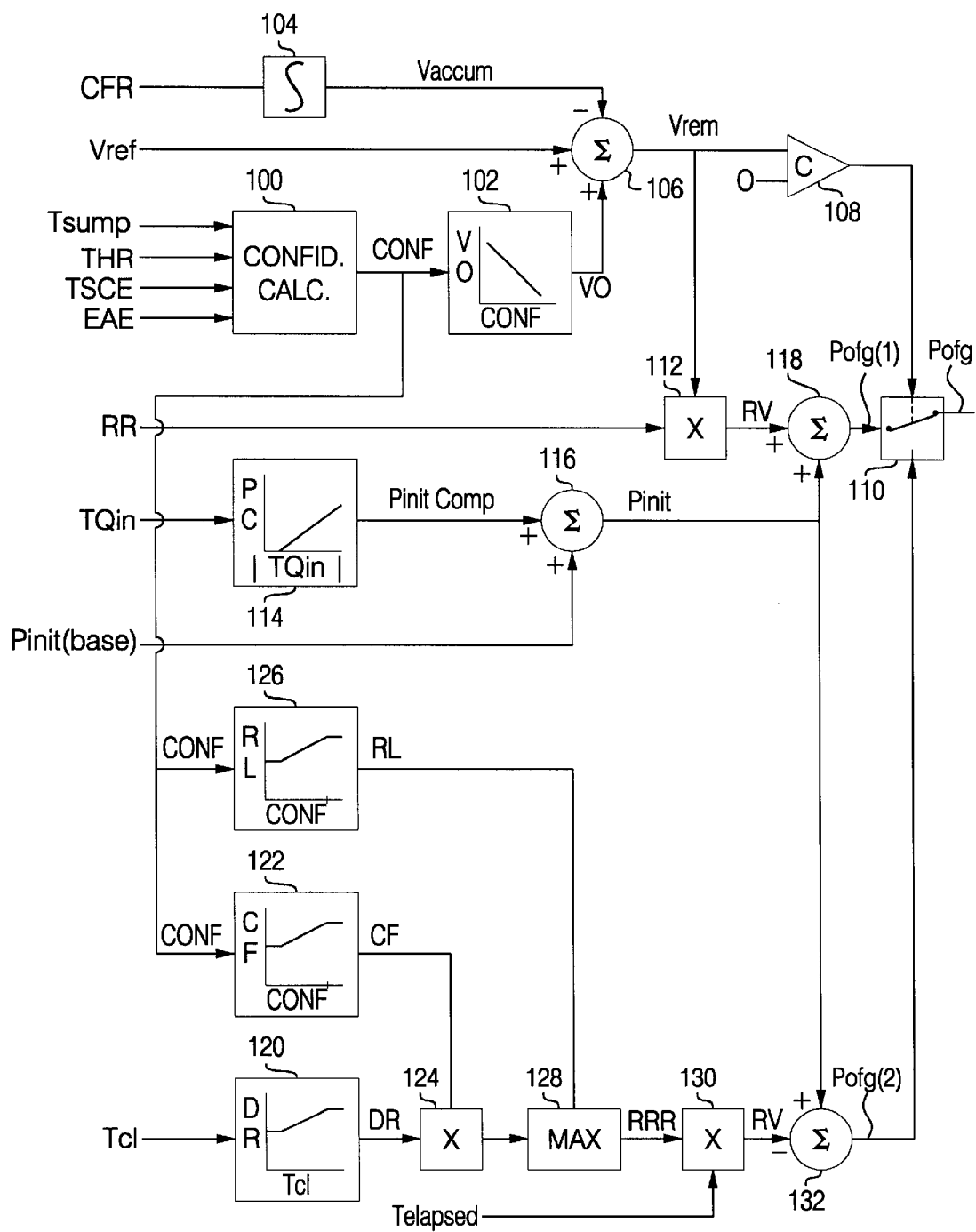
FIG. 11 is a block diagram illustrating the control of this invention as carried out by the control unit of FIG. 1.

The above-described control is depicted in block diagram form in FIG. 11, where the various blocks 100–132 represent functions performed by the transmission control unit 66. Broadly, the blocks 100–106 and 112–118 cooperate to form the pressure command Pofg(1) for the preparation phase of the shift, and the blocks 100, 114–116 and 120–132 cooperate to form the pressure command Pofg(2) for the torque and inertia phases of the shift. Both Pofg(1) and Pofg(2) are applied as inputs to the switch block 110, which selects one of the inputs to form the off-going pressure command Pofg, based on the output of comparator block 108.

The preparation phase off-going clutch pressure Pofg(1) progressively decreases at a ramp rate RR, reaching a pressure Pinit when the on-coming clutch is completely filled, assuming that the confidence level CONF is high. The ramp rate RR is defined in terms of a pressure per unit un-filled or remaining volume of the on-coming clutch. The remaining volume Vrem of the on-coming clutch is determined based on the known volume Vref of the on-coming clutch and an estimate of the clutch flow rate CFR. The clutch flow rate CFR, which may be estimated based on the pump speed and the commanded on-coming clutch pressure, is integrated at block 104 to determine the cumulative volume Vaccum of fluid supplied to the on-coming clutch. The summer 106 subtracts the cumulative volume Vaccum from the known clutch volume Vref to form the remaining volume Vrem, and Vrem in turn, is multiplied by the ramp rate RR at block 112 to form a ramp value RV. Thus, the ramp value RV is highest at the initiation of the shift, and then progressively decreases as the on-coming clutch is filled in preparation for torque transmission.

A final factor affecting the ramp value RV is a volume offset VO based on the confidence level CONF determined at block 100. As indicated above, the confidence level CONF may be determined based on several considerations including the transmission fluid temperature Tsump, the rate of change of engine output torque (or engine throttle THR) during shifting, the time TSCE since the on-coming clutch was last exhausted, and estimated air entrapment EAE. The confidence level CONF is applied as a input to block 102, which determines a volume offset VO that varies in inverse relation to the confidence level CONF; in other words, VO is highest when CONF is low, and lowest when CONF is high. The volume offset is applied to summer 106, and effectively increases the remaining volume Vrem, which correspondingly increases the ramp value RV. This produces a higher off-going clutch pressure during the preparation phase for low confidence shifts, as described above in reference to FIG. 10.

The pressure Pofg(1) is determined at block 118 as the sum of the ramp value RV and the initial torque phase pressure Pinit. The pressure Pinit is defined at block 116 as the sum of a base value Pinit(base) and an input torque dependent compensation value Pinit Comp. The base value Pinit(base) is selected for shifts with low transmission input torque, and the compensation value Pinit Comp increases in relation to input torque magnitude above a reference level, as indicated at block 114 and described above in reference to FIG. 6. The transmission input torque TQin may be determined based on the engine output torque EOT and the torque transfer characteristics of the torque converter 16, as will be well understood by those skilled in the art.

The pressure Pofg(1) is selected by switch block 110 as the off-going clutch pressure command Pofg until comparator block 108 determines that the remaining volume Vrem of the on-coming clutch has decreased to zero. The time at which this condition occurs corresponds to the time t1 or t2 described above in reference to FIG. 7. When the confidence level CONF is high, the volume offset VO is negligible, and the switch 110 is triggered to switch states when it is estimated that the on-coming clutch is completely filled. However, when the confidence level CONF is low, the volume offset VO increases Vrem, effectively delaying the switch point (Tinit) as described above in reference to FIG. 10.

The off-going clutch pressure command Pofg(2) starts at Pinit, and then decreases at a determined release ramp rate RRR, as described above in reference to FIGS. 8 and 10. Thus, Pofg(2) is formed at summer 132 according to the difference (Pinit−RV), where RV is the rate value at a given time. The rate value RV, in turn, is determined at block 130 according to the product of RRR and the time (Telapsed) since the switch 110 was triggered to select Pofg(2) as the off-going pressure command Pofg; that is, the time since Tinit. At the moment the switch 110 is triggered by comparator block 108, Telapsed is zero, and Pofg(2) is equal to Pinit; thereafter, Pofg(2) decreases at the rate RRR.

When the confidence level CONF is high, the release ramp rate RRR is determined as a unction of the scheduled on-coming clutch torque Tcl, as described above in reference to FIG. 8, and as indicated at block 120. Thus, block 120 produces a desired rate DR that generally varies in proportion to Tcl, resulting in rate of off-going pressure reduction that increases as the on-coming clutch torque increases. The desired rate DR is multiplied by a confidence factor CF at block 124 and compared with a confidence-based rate limit RL at maximum select (MAX) block 128 to form the release ramp rate RRR. When the confidence level CONF is high, the blocks 124 and 128 have little or no effect on DR, and RRR is essentially equivalent to DR; in this case, CF has a value of one, and RL is lower than the lowest value of DR scheduled by block 120. However, as the confidence level CONF decreases, the confidence factor CF and the rate limit RL both decrease, as indicated at the blocks 122 and 126, respectively. This has the effect of reducing the rate RRR below the base desired rate DR, but not below the rate limit RL.

In summary, the control of this invention releases the off-going clutch based on the on-coming clutch control parameters so as to emulate the behavior of an ideal free-wheel device. During the preparation phase of the shift, the off-going pressure is reduced in proportion to the estimated volume of fluid supplied to the on-coming clutch such that the off-going pressure is at a calibrated value (Pinit) when the on-coming clutch is filled, but the calibrated value is adjusted upward in direct relation to the transmission input torque above a given level so as to emulate the reaction torque that would be exerted by an ideal free-wheel device for maintaining the current (old) speed ratio. During the torque phase of the shift, the off-going pressure decreases from the calibrated value (Pinit) at a rate determined as a function of the scheduled on-coming clutch torque to emulate the rate of decay that would occur with an ideal free-wheel device as the on-coming clutch engages. However, under low confidence conditions such as low or high fluid temperatures or transient input torque levels, the off-going clutch control parameters are biased to extend the engagement of the off-going clutch, and the off-going pressure is released in response to a detected tie-up condition due to engagement of the on-coming clutch.

While described in reference to the illustrated embodiment, it will be understood that various modifications in addition to those mentioned above will occur to those skilled in the art. For example, the data stored in the various look-up tables may vary from application to application; the confidence level may be determined differently than shown; other parameters such as the base pressure Pinit(b) may be subject to adjustment based on the confidence level; and so on. Thus, it will be understood that controls incorporating these and other modifications may fall within the scope of this invention, which is defined by the appended claims.

What is claimed is:

1. An off-going clutch control method for an automatic transmission in which shifting from a current speed ratio to a new speed ratio is carried out by supplying hydraulic fluid to an on-coming clutch associated with the new speed ratio to fill and then engage such on-coming clutch in accordance with a commanded torque capacity, and releasing a fluid pressure present in an off-going clutch associated with the current speed ratio to disengage such off-going clutch, the control method comprising the steps of:

determining a cumulative volume of hydraulic fluid supplied to the on-coming clutch;

reducing a fluid pressure in the off-going clutch in relation to the determined cumulative volume of fluid supplied to the on-coming clutch such that the fluid pressure in the off-going clutch reaches a calibrated initial pressure value when the on-coming clutch becomes filled with hydraulic fluid; and once the on-coming clutch becomes filled with hydraulic fluid, reducing the fluid pressure in the off-going clutch from said calibrated initial pressure value at a calibrated final release rate determined as a function of the commanded torque capacity of the on-coming clutch, such that the off-going clutch is disengaged at a rate that matches a rate of engagement of the on-coming clutch.

2. The control method of claim 1, including the steps of:

estimating an input torque applied to said transmission; and increasing said calibrated initial pressure value in relation to the estimated input torque above a reference level so that the fluid pressure in the off-going clutch is sufficient to maintain said current speed ratio prior to the engagement of said on-coming clutch.

3. The control method of claim 1, wherein the step of reducing the fluid pressure in the off-going clutch in relation to the determined cumulative volume of fluid supplied to the on-coming clutch comprises the steps of:

determining a remaining un-filled volume of the on-coming clutch according to a difference between the determined cumulative volume and a reference volume corresponding to a known volume of said on-coming clutch;

determining a pressure reduction value based on the determined remaining un-filled volume and a desired reduction rate; and controlling the fluid pressure in the off-going clutch according to a sum of said calibrated initial pressure value and the determined pressure reduction value.

4. The control method of claim 3, including the steps of:

determining a confidence value based on measured transmission parameters and representing a relative ability of the control method to accurately control the on-coming and off-going clutch pressures; and increasing the determined remaining un-filled volume when the determined confidence value represents a decreased relative ability of the control method to accurately control the on-coming and off-going clutch pressures.

5. The control method of claim 1, including the steps of:

determining a confidence value based on measured transmission parameters and representing a relative ability of the control method to accurately control the on-coming and off-going clutch pressures; and increasing said calibrated initial pressure value when the determined confidence value represents a decreased relative ability of the control method to accurately control the on-coming and off-going clutch pressures.

6. The control method of claim 1, including the steps of:

determining a confidence value based on measured transmission parameters and representing a relative ability of the control method to accurately control the on-coming and off-going clutch pressures; and decreasing said calibrated final release rate when the determined confidence value represents a decreased relative ability of the control method to accurately control the on-coming and off-going clutch pressures.

7. The control method of claim 1, wherein the step of reducing the fluid pressure in the off-going clutch once the on-coming clutch becomes filled with hydraulic fluid comprises the steps of:

determining a remaining un-filled volume of the on-coming clutch according to a difference between the determined cumulative volume and a reference volume corresponding to a known volume of said on-coming clutch; and reducing the fluid pressure in the off-going clutch at the calibrated final release rate when the determined remaining un-filled volume reaches a predefined threshold.

8. The control method of claim 7, including the steps of:

determining a confidence value based on measured transmission parameters and representing a relative ability of the control method to accurately control the on-coming and off-going clutch pressures; and increasing the determined remaining un-filled volume when the determined confidence value represents a decreased relative ability of the control method to accurately control the on-coming and off-going clutch pressures, to thereby delay the step of reducing the fluid pressure in the off-going clutch at the calibrated final release rate.

9. An off-going clutch control method for an automatic transmission in which shifting from a current speed ratio to a new speed ratio is carried out by supplying hydraulic fluid to an on-coming clutch associated with the new speed ratio to fill and then engage such on-coming clutch in accordance with a commanded torque capacity, and releasing a fluid pressure present in an off-going clutch associated with the current speed ratio to disengage such off-going clutch, the control method comprising the steps of:

determining a cumulative volume of hydraulic fluid supplied to the on-coming clutch;

determining a remaining un-filled volume of the on-coming clutch according to a difference between the determined cumulative volume and a reference volume corresponding to a known volume of said on-coming clutch;

determining a pressure reduction value based on the determined remaining un-filled volume and a desired reduction rate;

controlling the fluid pressure in the off-going clutch according to a sum of a calibrated initial pressure value and the determined pressure reduction value such that the fluid pressure in the off-going clutch reaches said calibrated initial pressure value when the determined remaining un-filled volume reaches zero; and when the determined remaining un-filled volume reaches zero, reducing the fluid pressure in the off-going clutch from said calibrated value at a calibrated final release rate determined as a function of the commanded torque capacity of the on-coming clutch such that the off-going clutch is disengaged at a rate that matches a rate of engagement of the on-coming clutch.

10. The control method of claim 9, including the steps of:

estimating an input torque applied to said transmission; and increasing said calibrated initial pressure value in relation to the estimated input torque above a reference level so that the fluid pressure in the off-going clutch is sufficient to maintain said current speed ratio prior to the engagement of said on-coming clutch.

11. The control method of claim 9, including the steps of:

determining a confidence value based on measured transmission parameters and representing a relative ability of the control method to accurately control the on-coming and off-going clutch pressures; and increasing the determined remaining un-filled volume when the determined confidence value represents a decreased relative ability of the control method to accurately control the on-coming and off-going clutch pressures.

12. The control method of claim 11, including the step of:

decreasing said calibrated final release rate when the determined confidence value represents a decreased relative ability of the control method to accurately control the on-coming and off-going clutch pressures.

* * * * *